US011104760B2

(12) United States Patent
Onizuka et al.

(10) Patent No.: US 11,104,760 B2
(45) Date of Patent: Aug. 31, 2021

(54) THERMOSETTING RESIN COMPOSITION

(71) Applicant: ASAHI KASEI KABUSHIKI KAISHA, Tokyo (JP)

(72) Inventors: Kenzo Onizuka, Tokyo (JP); Yoshinori Ozumi, Tokyo (JP); Takanori Maeda, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/494,404

(22) PCT Filed: Mar. 16, 2018

(86) PCT No.: PCT/JP2018/010492
§ 371 (c)(1),
(2) Date: Sep. 16, 2019

(87) PCT Pub. No.: WO2018/169059
PCT Pub. Date: Sep. 20, 2018

(65) Prior Publication Data
US 2020/0087445 A1  Mar. 19, 2020

(30) Foreign Application Priority Data

Mar. 17, 2017 (JP) .............................. JP2017-052539
Mar. 17, 2017 (JP) .............................. JP2017-052691

(51) Int. Cl.
*C08G 59/56* (2006.01)
*C08G 59/40* (2006.01)
*C08L 63/00* (2006.01)

(52) U.S. Cl.
CPC ......... *C08G 59/56* (2013.01); *C08G 59/4035* (2013.01); *C08G 59/4042* (2013.01); *C08L 63/00* (2013.01); *C08L 2201/00* (2013.01); *C08L 2203/20* (2013.01); *C08L 2207/53* (2013.01)

(58) Field of Classification Search
None
See application file for complete search history.

(56) References Cited

U.S. PATENT DOCUMENTS

| 2008/0251757 A1 | 10/2008 | Yamamoto et al. |
| 2009/0136732 A1 | 5/2009 | Uchida et al. |
| 2009/0261298 A1 | 10/2009 | Kondo et al. |

FOREIGN PATENT DOCUMENTS

| CN | 101128502 A | 2/2008 |
| JP | 63-307984 A | 12/1988 |
| JP | 2007-91901 A | 4/2007 |
| JP | 2007-297604 A | 11/2007 |
| JP | 2009-173763 A | 6/2009 |
| JP | 2013-1875 A | 1/2013 |
| JP | 2013-105960 A | 5/2013 |
| JP | 2014-51621 A | 3/2014 |
| JP | 2014-152236 A | 8/2014 |
| JP | 2015-113426 A | 6/2015 |
| JP | 2015-174967 A | 10/2015 |
| JP | 2015-221859 A | 12/2015 |
| JP | 2016-108429 A | 6/2016 |
| JP | 2016-130287 A | 7/2016 |
| WO | WO 2007/037378 A1 | 4/2007 |

OTHER PUBLICATIONS

European Search Report dated Feb. 14, 2020, for European Application No. 18767415.5.
English translation of International Preliminary Report on Patentability and Written Opinion dated Sep. 26, 2019, in PCT/JP2018/010492 (Forms PCT/IB/326, PCT/IB/373, and PCT/ISA/237).
International Search Report, issued in PCT/JP2018/010492, dated Jun. 12, 2018.
Written Opinion of the International Searching Authority, issued in PCT/JP2018/010492, dated Jun. 12, 2018.

*Primary Examiner* — Megan McCulley
(74) *Attorney, Agent, or Firm* — Birch, Stewart, Kolasch & Birch, LLP

(57) ABSTRACT

A thermosetting resin composition, wherein a cured product of the thermosetting resin composition that has been cured at 130° C. for 15 minutes has a moisture absorptivity of 2.5% or less after 168 hours at 85° C. and 85% RH, and a ratio of the light transmittance with a wavelength of 700 nm/the light transmittance with a wavelength of 400 nm of 2 or less.

14 Claims, No Drawings

THERMOSETTING RESIN COMPOSITION

TECHNICAL FIELD

The present invention relates to a thermosetting resin composition.

BACKGROUND ART

Thermosetting resins and thermosetting resin compositions have been conventionally utilized in a wide variety of applications such as an insulating material for electronic devices, electrical and electronic components, a sealing material, an adhesive, and an electrically conductive material.

Especially for electronic devices, due to higher functionality, miniaturization and thinning, as semiconductor chips become more miniaturized and integrated and circuits become more densified, significant improvement in the productivity, improvement in the portability and reliability in mobile usage of the electronic device, or the like has been sought.

Examples of the above-mentioned thermosetting resin compositions utilized in various applications include epoxy resin compositions. Examples of a method of curing the epoxy resin composition include a method of using a liquid amine curing agent in a so-called two-component epoxy resin composition (hereinafter, may be described as a "two-part epoxy resin composition"), in which two components, an epoxy resin and a curing agent, are mixed and cured when it is used.

In the meantime, the two-part epoxy resin composition can be cured satisfactorily at a low temperature by use of a liquid amine curing agent mentioned above. However, before using the two-part epoxy resin composition, it is necessary to store the epoxy resin and the curing agent separately, and when in use, both need to be weighed and mixed quickly and uniformly. In addition, once the epoxy resin and the curing agent are mixed, the time usable after that is limited, and therefore, there is a problem that it is not possible to mix them in a large amount in advance.

In conventionally known two-part epoxy resin compositions, it is hard to meet all demands at a practical level, such as storing easiness, handleability, compounding frequency (production efficiency), curability, and physical properties of the cured product, and there is a problem that room for improvement still exists.

In order to meet these demands, several one-component epoxy resin compositions (hereinafter, may be described as "one-part epoxy resin compositions") have been proposed. Examples of such a one-part epoxy resin composition include one-part epoxy resin compositions in which, a latent curing agent such as dicyandiamide, a $BF_3$-amine complex, an amine salt, and a modified imidazole compound is compounded into the epoxy resin.

However, there is a problem that these one-part epoxy resin compositions tend to be inferior in curability when they are excellent in storage stability, and tend to be inferior in storage stability when they are excellent in curability.

Under such circumstances, a so-called microcapsular curing agent, in which a core including an amine curing agent is covered with a specific shell, has been proposed (see, for example, Patent literature 1).

Moreover, in order to enable the use for electronic members or the like, an epoxy resin composition with improved crack resistance has been proposed (see, for example, Patent Literature 2).

CITATION LIST

Patent Literature

Patent Literature 1: Japanese Patent Laid-Open No. 2014-51621

Patent Literature 2: Japanese Patent Laid-Open No. 2016-130287

SUMMARY OF INVENTION

Technical Problem

Patent Literature 1 describes an epoxy resin composition with improved storage stability and low temperature curability, and Patent Literature 2 describes an epoxy resin composition from which a cured product with excellent light transmittance and little occurrence of cracks can be obtained.

However, the epoxy resin compositions disclosed therein have a problem that the adhesiveness to organic substrates, which recently began to be used more for electronic members, is in sufficient and they are not suited for sealing organic substrates.

Accordingly, the present invention has an object to provide an epoxy resin composition that has satisfactory adhesiveness to organic substrates and metals and that has excellent handleability.

Solution to Problem

As a result of diligent researches of the present inventors in order to solve the above-mentioned problems of the prior art, it was found that a thermosetting resin composition whose cured product that has been cured at specific curing conditions meets predetermined physical properties can solve the above-mentioned problems, thereby leading to the completion of the present invention.

That is, the present invention is as follows:

[1]

A thermosetting resin composition, wherein a cured product of the thermosetting resin composition that has been cured at 130° C. for 15 minutes has:

a moisture absorptivity of 2.5% or less after 168 hours at 85° C. and 85% RH; and a ratio of the light transmittance with a wavelength of 700 nm/the light transmittance with a wavelength of 400 nm of 2 or less.

[2]

The thermosetting resin composition according to [1], wherein the cured product of the thermosetting resin composition that has been cured at 130° C. for 15 minutes has:

a light transmittance of 70% or more with a wavelength of 700 nm measured with a spectrophotometer.

[3]

The thermosetting resin composition according to [1] or [2], further comprising an epoxy resin and a curing agent.

[4]

The thermosetting resin composition according to any one of [1] to [3], wherein the cured product of the thermosetting resin composition that has been cured at 130° C. for 15 minutes has:

a light transmittance of 75% or more with a wavelength of 700 nm measured with a spectrophotometer.

[5]
The thermosetting resin composition according to any one of [1] to [4], wherein
the cured product of the thermosetting resin composition that has been cured at 130° C. for 15 minutes has:
a ratio of the light transmittance with a wavelength of 700 nm/the light transmittance with a wavelength of 400 nm of 1.22 or less.

[6]
The thermosetting resin composition according to any one of [3] to [5], wherein the curing agent comprises:
a microcapsular curing agent (H) for epoxy resins, having a core (C) and a shell (S); and
a non-microcapsular curing agent (h).

[7]
The thermosetting resin composition according to [6], wherein
the non-microcapsular curing agent (h) is a cyanamide and/or a low molecular weight compound having a hydrazide group.

[8]
The thermosetting resin composition according to [6] or [7], wherein
the core (C) in the microcapsular curing agent (H) for epoxy resins comprises:
(I): an amine adduct (AD) and its component, an amine compound (A); and
(II): a curing agent (h1) other than said (I).

[9]
The thermosetting resin composition according to [8], wherein the amine compound (A) is an amine compound represented by formula (1) and/formula (2) below:

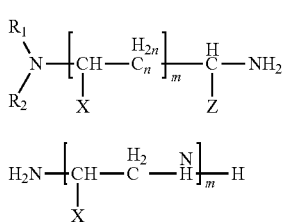

wherein $R_1$ and $R_2$ are each independently an optionally substituted alkyl group having 1 or more and 8 or less carbon atoms, an optionally substituted cycloalkyl group, or an optionally substituted benzyl group; X and Z each independently represent a hydrogen atom, an optionally substituted alkyl group having 1 or more and 8 or less carbon atoms, an optionally substituted aryl group, an optionally substituted cycloalkyl group, or an optionally substituted benzyl group; and n represents an integer of 0 or more and 8 or less, and m represents an integer of 0 or more and 4 or less.

[10]
The thermosetting resin composition according to [8] or [9], wherein said (II): the curing agent (h1) other than said (I) has a number average molecular weight of 400 or less.

[11]
The thermosetting resin composition according to any one of [8] to [10], wherein
the curing agent (h1) is at least one selected from the group consisting of an amine compound (A') other than the amine compound (A), a hydrazide resin and a phenolic resin.

[12]
The thermosetting resin composition according to any one of [8] to [11], wherein the amine adduct (AD) comprises an amine adduct having at least one tertiary amino group (d2) resulting from a reaction between an epoxy resin (e1) and an amine compound having 1 to 15 carbon atoms.

[13]
The thermosetting resin composition according to any one of [8] to [12], wherein
the amine compound (A) has at least one tertiary amino group.

[14]
The thermosetting resin composition according to any one of [8] to [13], wherein
said (II): the curing agent (h1) other than said (I) has a melting point of 30° C. or more and 240° C. or less.

[15]
The thermosetting resin composition according to any one of [8] to [14], wherein
the content of the curing agent (h1) is 0.1% by mass or more and 50% by mass or less relative to 100% by mass of the core (C).

[16]
The thermosetting resin composition according to any one of [1] to [15], further comprising an organic filler and/or an inorganic filler.

Advantageous Effects of Invention

According to the present invention, a thermosetting resin composition that has satisfactory adhesiveness to organic substrates and metals and that has excellent handleability can be obtained.

DESCRIPTION OF EMBODIMENT

From now on, a mode for carrying out the present invention (hereinafter, referred to as "the present embodiment") will be described in detail.
The present embodiment is an example for describing the present invention and does not mean to limit the present invention to the following contents. The present invention can be carried out with various modifications within the scope of its gist.
[Thermosetting Resin Composition]
A thermosetting resin composition of the present embodiment is a thermosetting resin composition, wherein a cured product of the thermosetting resin composition that has been cured at 130° C. for 15 minutes has a moisture absorptivity of 2.5% or less after 168 hours at 85° C. and 85% RH, and a ratio of the light transmittance with a wavelength of 700 nm/the light transmittance with a wavelength of 400 nm of 2 or less.
(Thermosetting Resin)
The thermosetting resin composition of the present embodiment contains a thermosetting resin.
Examples of the thermosetting resin include, but are not limited to, epoxy resins, melamine resins, phenolic resins, unsaturated polyesters, vinyl esters and cyanate esters.
Among these, epoxy resins are preferable from the viewpoint of storage stability, adhesiveness and heat resistance.
(Epoxy Resin)
It is preferable that the thermosetting resin composition of the present embodiment contain an epoxy resin.
Examples of the epoxy resin include, but are not limited as long as the effects of the present invention can be provided, bifunctional epoxy resins such as bisphenol A epoxy resin, bisphenol F epoxy resin, bisphenol AD epoxy resin, tetrabromobisphenol A epoxy resin, biphenyl epoxy resin, tetramethylbiphenyl epoxy resin, tetrabromobiphenyl epoxy resin, diphenyl ether epoxy resin, benzophenone epoxy resin, phenyl benzoate epoxy resin, diphenyl sulfide epoxy resin, diphenyl sulfoxide epoxy resin, diphenylsulfone epoxy resin, diphenyl disulfide epoxy resin, naphthalene epoxy resin, anthracene epoxy resin, hydroquinone epoxy resin, methylhydroquinone epoxy resin, dibutylhydroquinone epoxy resin, resorcin epoxy resin, mehtylresorcin epoxy resin, catechol epoxy resin and N,N-diglycidylaniline epoxy resin; trifunctional epoxy resins such as N,N-diglycidylaminobenzene epoxy resin, o-(N,N-diglycidylamino)toluene epoxy resin and triazine epoxy resin; tetrafunctional epoxy resins such as tetraglycidyl-diaminophenylmethane epoxy resin and diaminobenzene epoxy resin; multifunctional epoxy resins such as phenol novolac epoxy resin, cresol novolac epoxy resin, triphenylmethane epoxy resin, tetraphenylethane epoxy resin, dicyclopentadiene epoxy resin, naphthol aralkyl epoxy resin and brominated phenol novolac epoxy resin; and alicyclic epoxy resins. Furthermore, epoxy resins obtained by modifying the above with isocyanate or the like can be used in combination.

(Curing Agent)

It is preferable that the thermosetting resin composition of the present embodiment contain a curing agent.

Examples of the curing agent include, but are not particularly limited to, as long as the effects of the present invention can be provided, microcapsular curing agents (H) for epoxy resins, which will be mentioned later, amine curing agents, amide curing agents, acid anhydride curing agents, phenol curing agents, latent curing agents and catalytic curing agents.

The curing agent is not limited to the above.

Examples of the amine curing agent include, but are not limited to, aliphatic amines and aromatic amines.

Examples of the aliphatic amine include, but are not limited to, diethylenetriamine, triethylenetetramine, tetraethylenepentamine, m-xylenediamine, trimethylhexamethylenediamine, 2-methylpentamethylenediamine, isophoronediamine, 1,3-bisaminomethylcyclohexane, bis(4-aminocyclohexyl)methane, norbornene diamine and 1,2-diaminocyclohexane.

Examples of the aromatic amine include, but are not limited to, diaminodiphenylmethane, m-phenylenediamine, diaminodiphenylsulfone, diethyltoluenediamine, trimethylene bis(4-aminobenzoate) and poly(tetramethylene oxide-di-p-aminobenzoate).

Examples of the amide curing agent include guanidine compounds which is dicyandiamide and derivatives thereof, or those obtained by adding an acid anhydride to an amine curing agent, hydrazide compounds.

Examples of the hydrazide curing agent consisting of a hydrazide compound include, but are not limited to, succinic acid dihydrazide, adipic acid dihydrazide, phthalic acid dihydrazide, isophthalic acid dihydrazide, terephthalic acid dihydrazide, p-oxybenzoic acid hydrazide, salicylic acid hydrazide, phenylaminopropionic acid hydrazide and maleic acid dihydrazide.

Examples of the guanidine curing agent consisting of a guanidine compound include, but are not limited to, dicyandiamide, methylguanidine, ethylguanidine, propylguanidine, butylguanidine, dimethylguanidine, trimethylguanidine, phenylguanidine, diphenylguanidine and toluylguanidine.

Examples of the acid anhydride curing agent include, but are not limited to, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride and methylhexahydrophthalic anhydride.

Examples of the phenol curing agent include, but are not limited to, phenol novolac resin, cresol novolac resin, phenol aralkyl resin, cresol aralkyl resin, naphthol aralkyl resin, biphenyl-modified phenolic resin, biphenyl-modified phenol aralkyl resin, dicyclopentadiene-modified phenolic resin, aminotriazine-modified phenolic resin, naphthol novolac resin, naphthol-phenol co-condensed novolac resin, naphthol-cresol co-condensed novolac resin and allyl acrylic phenolic resin.

Examples of the latent curing agent include those obtained by encapsulating imidazoles, dicyandiamide and derivatives thereof, imidazole latent curing agents, or amine adducts. For the latent curing agent, commercial products may also be used, and examples include, but are not limited to, the AMICURE series such as "PN23", "PN40" and "PN-H" (from Ajinomoto Fine-Techno Co., Inc.), and the Novacure series such as "HX-3088", "HX-3941" and "HX-3742" (from ASAHI KASEI E-materials Corp.)

Examples of the catalytic curing agent include, but are not limited to, cationic heat curing catalysts and $BF_3$-amine complexes.

One of these curing agents may be used singly, or two or more curing agents may be used in combination.

The thermosetting resin composition of the present embodiment may further contain a curing accelerator.

Examples of the curing accelerator include, but are not limited to, imidazole curing accelerators such as 2-methylimidazole, 2-ethylimidazole and 2-ethyl-4-methylimidazole; tertiary amine curing accelerators such as 2-(dimethylaminomethyl)phenol, 1,5-diazabicyclo[4.3.0]non-5-ene and 1,8-diazabicyclo[5.4.0]undec-7-ene; phosphorus curing accelerators such as triphenylphosphine; organic acid metal salts; Lewis acids; and amine complex salts.

These curing accelerators can further accelerate a curing reaction when they are used in combination with the above-mentioned curing agents or microcapsular curing agents (H) for epoxy resins, which will be mentioned later.

Moreover, an appropriate type of curing accelerators can be selected depending on the type of the curing agent.

In the thermosetting resin composition of the present embodiment, when a cured product of the thermosetting resin composition that has been cured at 130° C. for 15 minutes is stored at a temperature of 85° C. and a humidity of 85% RH, the moisture absorptivity measured after 168 hours is 2.5% or less. It is preferably 2.2% or less, and more preferably 2.0% or less.

When the moisture absorptivity is 2.5% or less, it is believed that this suggests a sufficient progression of the reaction between functional groups constituting the thermosetting resin, for example, between epoxy groups, thereby maintaining the adhesive force to a metal and the retention rate of the adhesive forth to a metal after the moisture absorption.

In the thermosetting resin composition of the present embodiment, the moisture absorptivity can be controlled at 2.5% or less by reducing the remaining functional groups constituting the thermosetting resin, for example, the remaining epoxy groups.

In addition, in the thermosetting resin composition of the present embodiment, the cured product that has been cured at 130° C. for 15 minutes has a ratio of the light transmittance with a wavelength of 700 nm/the light transmittance with a wavelength of 400 nm of 2 or less, preferably 1.5 or less, and more preferably 1.22 or less.

Furthermore, in the thermosetting resin composition of the present embodiment, the cured product that has been cured at 130° C. for 15 minutes preferably has a ratio of the light transmittance with a wavelength of 700 nm/the light transmittance with a wavelength of 380 nm of 2 or less, more preferably 1.75 or less, and further preferably 1.5 or less.

When in the state as mentioned above, it is believed that the cured product is a uniform or has a phase separated structure state close to uniform state, thereby increasing stress relaxation after the curing.

In the thermosetting resin composition of the present embodiment, a light transmittance with a wavelength of 700 nm measured the cured product that has been cured at 130° C. for 15 minutes with a spectrophotometer is preferably 70% or more, is more preferably 75% or more, is further preferably 77% or more, and is even further preferably 80% or more.

When the cured product has 70% or more of a light transmittance with a wavelength of 700 nm, the cured product is a uniform one or a cured product with microphase separation that is fine and close to uniform state in which light scattering is suppressed, thereby increasing internal stress relaxation. As such, the thermosetting resin composition of the present embodiment has an increased interfacial free energy, and the adhesive forth to a substrate, in particular, an organic substrate is improved.

The light transmittance in the cured product of the thermosetting resin composition of the present embodiment can be controlled to be 70% or more and more preferably 75% or more by suppressing uneven curing or by adjusting the curing domain.

As described above, when the cured product of the thermosetting resin composition of the present embodiment, due to a ratio of the light transmittance with a wavelength of 700 nm/the light transmittance with a wavelength of 400 nm is 2 or less, is preferably 1.22 or less, the cured product is a uniform one or a cured product with microphase separation that is fine and close to uniform state in which light scattering is suppressed, thereby increasing internal stress relaxation. As such, the thermosetting resin composition of the present embodiment has an improved adhesive forth to a substrate, in particular, an organic substrate.

In the cured product of the thermosetting resin composition of the present embodiment, (the light transmittance with a wavelength of 700 nm/the light transmittance with a wavelength of 400 nm) can be controlled to be 2 or less, preferably 1.22 or less by suppressing uneven curing or by adjusting the curing domain.

The thermosetting resin composition of the present embodiment preferably contains an epoxy resin and a curing agent, and the curing agent preferably includes a microcapsular curing agent (H) for epoxy resins (hereinafter, may be simply described as a "curing agent (H)") and a curing agent (h) for non-microcapsular.

The curing agent (H) is a microcapsular latent curing agent having a core (C) and a shell (S) covering the core. According to this, effects of improving the storage stability can be obtained.

As long as it thermally cures the epoxy resin and the cured product meets predetermined physical properties as mentioned above, the non-microcapsular curing agent (h) is not particularly limited, but considering the storage stability of the epoxy resin composition, those that are solid under a room temperature environment are preferable.

Curing agents that are solid under a room temperature environment have a lower compatibility to the epoxy resin at room temperature compared to liquid curing agents, and since the storage stability is improved and the time usable is prolonged, there is no need to use them up in one day, which is preferable from the viewpoint of industrial productivity and handleability.

The non-microcapsular curing agent (h) may be used for making a masterbatch epoxy resin curing agent including the microcapsular curing agent (H) for epoxy resins and the non-microcapsular curing agent (h) by mixing it in a general, commercially available state.

Note that it is preferable that the non-microcapsular curing agent be dispersed with a fine particle diameter in the epoxy resin from the viewpoint of the curability of the non-microcapsular curing agent (h). In addition, before making it dispersed using a dispersing apparatus, if the non-microcapsular curing agent (h) is made into a roughly ground state in advance by using an agate mortar or the like, the time required for the dispersion into the epoxy resin can be suitably shortened.

A method of dispersing and mixing the non-microcapsular curing agent (h), which has been ground as mentioned above, into the epoxy resin as mentioned above is not particularly limited, but examples of the method include a method of using: a dry-type bead mill, which performs dispersion by adding hard beads, a dispersion medium and an object to be dispersed thereto with no solvent and performing high speed stirring to break the object to be dispersed with hard beads and make the particle diameter smaller; a wet-type bead mill, which performs dispersion with the same principle in a solvent; a homodisper, which performs dispersion by contacting agitating blades rotating at a high speed with an object to be dispersed to break it and make the particle diameter smaller; or a three-roller dispersing machine, in which three rollers are arranged at extremely narrow intervals and each roller rotates at a different speed and in a different rotational direction such that an object to be dispersed can be kneaded and dispersed owing to compression caused by it being pushed into narrow intervals of the rollers and shearing due to the speed difference among the rollers.

In particular, as the method of dispersing the non-microcapsular curing agent (h) into the epoxy resin, a method of using a three-roller dispersing machine is preferable.

In the case of a bead mill, beads need to be filtered off after the dispersion, and in a wet-type bead mill, selection of a solvent in which the non-microcapsular curing agent is not dissolved should be performed and a step of drying is also included, and therefore, the costs tend to be high. In contrast, in the case of a three-roller dispersing machine, the processing speed per unit time is fast, and there is no need to remove unnecessary substances such as beads because only the epoxy resin and the non-microcapsular curing agent (h) are included, and therefore, there is an advantage that the dispersion step can be carried out with a relatively low cost. In addition, the degree of dispersion of the non-microcapsular curing agent (h) can be readily adjusted by adjusting the gap between rollers or the rotational speed, which is suitable.

When the curing agent includes the above-mentioned curing agent (h) for non-microcapsular, the curing agent (h) for non-microcapsular is preferably a cyanamide and/or a low molecular weight compound having a hydrazide group from the viewpoint of safety.

In the present specification, the low molecular weight compound refers to a compound with a molecular weight of 31 or more and 600 or less.

As long as the effects of the present invention can be provided, examples of the cyanamides as the non-microcapsular curing agent (h) include, but are not particularly limited to, dicyandiamide, methylguanidine, ethylguanidine, propylguanidine, butylguanidine, dimethylguanidine, trimethylguanidine, phenylguanidine, diphenylguanidine, toluylguanidine, dicyanodiamidine, (L)-arginine and nitroguanidine. Preferably, dicyandiamide may be mentioned.

The melting point of dicyandiamide is about 208° C., and thus, when its particle diameter is decreased to a fine particle order and it is then dispersed into the epoxy resin using a three-roller dispersing machine, the storage stability under room temperature conditions is excellent and the handleability is satisfactory. Moreover, 10 parts by mass of dicyandiamide relative to 100 parts by mass of the epoxy resin can provide a cured product with sufficient performances, and therefore, its reactivity in the presence of a catalyst is satisfactory.

As long as the effects of the present invention can be provided, examples of the low molecular weight compound having a hydrazide group as the non-microcapsular curing agent (h) include, but are not particularly limited to, for example, the following.

Examples of a compound having one hydrazide functional group in the molecule include, but are not limited to, isonicotinic acid hydrazide, benzenesulfonylhydrazide, cyanoacetohydrazide, nicotinic acid hydrazide, 2-nitrobenzohydrazide, formohydrazide, 4-nitrobenzohydrazide, salicylic acid hydrazide, phenylacetic acid hydrazide, acetohydrazide, 2-pyridinecarboxylic acid hydrazide, p-toluenesulfonic acid hydrazide, 2-aminobenzoylhydrazide, 4-methoxybenzohydrazide, 4-methylbenzohydrazide, stearic acid hydrazide, 4-aminobenzohydrazide, 4-hydroxybenzohydrazide, 3-methoxybenzohydrazide, propionic acid hydrazide, n-octanohydrazide, 2,4,6-trimethylbenzenesulfonylhydrazide and 4-tert-butylbenzohydrazide.

Examples of a compound having two hydrazide functional groups in the molecule include, but are not limited to, terephthalic acid dihydrazide, 1,3-diaminourea (carbohydrazide), sebacic acid dihydrazide, oxalic acid dihydrazide, adipic acid dihydrazide, thiocarbohydrazide, isophthalic acid dihydrazide, malonic acid dihydrazide, dodecanedihydrazide, azelaic acid dihydrazide, succinic acid dihydrazide and ethylmalonic acid dihydrazide.

Among these hydrazide compounds, a more preferable compound is a compound having two hydrazide functional groups in the molecule.

Furthermore, a preferable compound is a compound having two hydrazide functional groups and a melting point of 100° C. or above. This is because, when two hydrazide functional groups are present in the molecule, a crosslinked structure of the epoxy resin is easily formed and the reactivity improves. Moreover, if the melting point is 100° C. or above, even when a masterbatch curing agent is made in combination with the epoxy resin, as long as that curing agent is stored in a normal manner, the hydrazide compound is unlikely to be dissolved in the epoxy resin, thereby leading to an excellent storage stability.

In the curing agent, the core (C) in the microcapsular curing agent (H) for epoxy resins preferably contains (I): an amine adduct (AD) and its component, an amine compound (A), and (II): a curing agent (h1) other than said (I) from the viewpoint of reactivity.

The amine compound (A) is preferably a compound represented by formula (1) and/or formula (2) below, from the viewpoint of causing uniform curing or uniform phase separation.

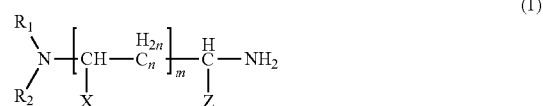

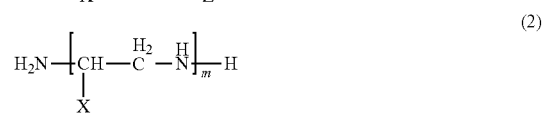

In the formulas (1) and (2), $R_1$ and $R_2$ are each independently an optionally substituted alkyl group having 1 or more and 8 or less carbon atoms, an optionally substituted cycloalkyl group, or an optionally substituted benzyl group; X and Z each independently represent a hydrogen atom, an optionally substituted alkyl group having 1 or more and 8 or less carbon atoms, an optionally substituted aryl group, an optionally substituted cycloalkyl group, or an optionally substituted benzyl group; and n represents an integer of 0 or more and 8 or less, and m represents an integer of 0 or more and 4 or less.

Examples of the optionally substituted alkyl group having 1 or more and 8 or less carbon atoms, represented by $R_1$ and $R_2$ in said formula (1), include, for example, a methyl group, an ethyl group, a n-propyl group, an isopropyl group, a cyclopropyl group, a n-butyl group, a sec-butyl group, a tert-butyl group, an isobutyl group, a n-pentyl group, an isopentyl group, a neopentyl group, a tert-pentyl group, a n-hexyl group, an isohexyl group, a n-heptyl group and a n-octyl group.

In addition, examples of the optionally substituted cycloalkyl group include a cyclobutyl group, a cyclopentyl group, a cyclohexyl group, a cycloheptyl group and a cyclooctyl group.

Examples of the optionally substituted alkyl group having 1 or more and 8 or less carbon atoms and the optionally substituted cycloalkyl group, represented by X and Z in said formulas (1) and (2), each include those shown as examples of $R_1$ and $R_2$.

In addition, examples of the optionally substituted aryl group include a phenyl group, a tolyl group and an o-xylyl group.

In the thermosetting resin composition of the present embodiment, from the viewpoint of curability, and physical properties of the cured product, preferable examples of the compound of said formula (1) include N,N-dimethylaminopropylamine, N,N-diethylaminopropylamine, N,N-dibutylaminopropylamine, N,N-dimethylaminoethylamine, N,N-diethylethylenediamine, N,N-diisopropylethylenediamine, N,N-dibutylethylenediamine, N,N-dimethylaminobutylamine, N,N-dipropylaminopropylamine, N,N-diisopropylaminopropylamine, 4-amino-1-diethylaminopentane, N,N-dimethyl-methanediamine, N,N-bis(1-methylethyl)-1,3-propanediamine, N,N-dimethyl-1,2-propanediamine and N,N-dimethyl-1,1-propanediamine.

In addition, examples of the compound of said formula (2) include methylamine, ethylamine, propylamine, butylamine, ethylenediamine, 1,2-propanediamine, tetramethylenediamine, 1,5-diaminopentane, hexamethylenediamine, 2,4,4-trimethylhexamethylenediamine, 2,2,4-triethylhexamethylenediamine, 1,2-diaminopropane, diethylenetriamine, triethylenetetramine, tetraethylenepentamine and pentaethylenehexamine.

The amine adduct (AD) is obtained by the reaction between an epoxy resin and the amine compound (A) and has a primary and/or secondary amino group.

A method of producing the amine adduct (AD) is not particularly limited, and considering the structure and the like of a desired amine adduct (AD), suitable conditions can be selected appropriately.

With respect to the ratio of the epoxy resin and the amine compound (A), they are allowed to react such that the active hydrogen group in the amine compound (A) is, relative to 1 equivalent of the epoxy group in the epoxy resin, within a range of preferably 0.8 equivalent or more and 20 equivalents or less, more preferably 0.9 equivalent or more and 12 equivalents or less, and further preferably 0.95 equivalent or more and 10 equivalents or less.

By allowing the epoxy resin and the amine compound (A) to react at said ratio, an amine adduct (AD) having a molecular weight distribution of 1 or more and 7 or less can be efficiently obtained.

Furthermore, by setting the proportion of the active hydrogen group in the amine compound to 1 equivalent of the epoxy group in the epoxy resin at 20 equivalents or less, an unreacted amine compound (A) can be efficiently recovered, which is excellent in economical efficiency.

For conditions of the reaction between the epoxy resin and the amine compound (A), it is preferable to allow them to react at a temperature of 50 to 250° C. for 0.1 to 10 hours in the presence of a solvent, as necessary.

Examples of the solvent include, but are not limited to, hydrocarbons such as benzene, toluene, xylene, cyclohexane, mineral spirit and naphtha; ketones such as acetone, methyl ethyl ketone (MEK) and methyl isobutyl ketone (MIBK); esters such as ethyl acetate, n-butyl acetate, propylene glycol monomethyl ether acetate; alcohols such as methanol, isopropanol, n-butanol, butyl cellosolve and butyl carbitol; and water.

One of these solvents may be used singly, or two or more solvents may be used in combination.

It is preferable that the solvent used be removed from the reaction system via distillation or the like after the reaction ends.

The amine adduct (AD) can react with an epoxy resin and a thermosetting liquid resin at a low temperature to develop adhesiveness and long term reliability.

Furthermore, the amine adduct (AD) can also be used to function as a component that reacts with an isocyanate compound, an active hydrogen compound, an epoxy resin and an amine compound in the reaction of forming the shell (S) covering the core (C) of the microcapsular curing agent (H) for epoxy resins, which contributes to the storage stability of the liquid resin composition. In other words, the amine adduct (AD) can also play a role as a curing agent (h1) other than said (I), which will be mentioned later.

As the amine adduct (AD), it is preferable to contain an amine adduct having at least one tertiary amino group (d2) obtained through the reaction between an epoxy resin (e1) and an amine compound having 1 to 15 carbon atoms (A), and it is more preferable that the amine compound (A) have at least one tertiary amino group.

As mentioned above, when the amine adduct (AD) contain an amine adduct having at least one tertiary amino group, or when the amine compound (A) has at least one secondary amino group, improvement in the curability under the temperature condition of 130° C. is expected in the thermosetting resin composition of the present embodiment.

It is preferable that the microcapsular curing agent (H) for epoxy resins include (I): the amine adduct (AD) and its component, the amine compound (A), and (II): the curing agent (h1) other than said (I) in the core (C) constituting the curing agent (H).

Examples of the curing agent (h1) include, but are not particularly limited to, the above-mentioned amine curing agents, amide curing agents, acid anhydride curing agents, phenol curing agents, latent curing agents and catalytic curing agents. More preferably, from the viewpoint of storage stability and transparency, one or more curing agents selected from an amine compound (A') other than the amine compound (A), a hydrazide resin and a phenolic resin are preferable.

Two or more curing agents (h1) may be used.

The curing agent (h1) other than said (I) preferably has a number average molecular weight of 400 or less.

It is preferable that the number average molecular weight of the curing agent (h1) be 400 or less from the viewpoint of preventing deterioration of the transmittance after heating over a long term. The number average molecular weight is more preferably 380 or less, and further preferably 350 or less.

The melting point or the softening point of the curing agent (h1) is each preferably 30° C. or more and 240° C. or less. It is more preferably 50° C. or more and 230° C. or less, and further preferably 70° C. or more and 220° C. or less.

When the melting point or the softening point is 30° C. or more, improvement in the long term storage stability is expected, and when it is 240° C. or less, improvement in the 130° C. reactivity is expected.

The melting point or the softening point of the curing agent (h1) can be controlled within the above-described temperature range by controlling the crystallinity or the molecular weight.

The proportion of the curing agent (h1) in the core (C) is preferably 0.1% by mass or more and 50% by mass or less. When it is 0.1% by mass or more, a fine, phase separated structure is caused, and the adhesive forth to an organic substrate is thus improved. It is more preferably 0.5% by mass or more, and further preferably 1.0% by mass.

In addition, it is preferable that the proportion in the core (C) be 50% by mass or less because the storage stability becomes satisfactory. It is more preferably 40% by mass or less, and further preferably 30% by mass or less.

It is preferable that the average particle diameter of the core (C) in the curing agent (H) be more than 0.3 μm and 12 μm or less.

When the average particle diameter of the core (C) is greater than 0.3 μm, several effects can be obtained that aggregation among the curing agent can be prevented, the microcapsular curing agent (H) for epoxy resins is readily formed, and the storage stability of the liquid resin composition becomes practically sufficient.

When the average particle diameter of the core (C) is 12 μm or less, a homogeneous, cured product can be obtained. In addition, upon compounding a diluting agent, a filler, a pigment, a dye, a flow modifier, a thickening agent, a reinforcement, a mold releasing agent, a wetting agent, a stabilizing agent, a flame retardant, a surfactant, an organic solvent, an electrically conductive fine particle, a crystalline alcohol, another resin or the like, generation of an aggregate having a large particle diameter can be prevented, and a sufficient, long term reliability of the cured product can be obtained.

The average particle diameter here means an average particle diameter defined by the median diameter.

More specifically, it means a Stokes' diameter measured by laser diffraction light scattering method using a particle size analyzer (from HORIBA, Ltd., "HORIBA LA-920").

Here, a method of controlling the average particle diameter of the core (C) is not particularly limited, and several methods may be mentioned. Example of these method include: a method of performing precise control in a grinding step of a block-like curing agent for epoxy resins; a method of performing a rough grinding step and a fine grinding step as a grinding step of a block-like curing agent for epoxy resins, and further classifying it to obtain particles with a desired average particle diameter using a precise classifying apparatus; a method of spray drying a solution of a curing agent for epoxy resins in which the block-like curing agent for epoxy resins is dissolved in a solvent; and the like.

For an apparatus used for grinding, for example, a ball mill, an attritor, a bead mill, a jet mill or the like can be employed as necessary, but it is preferable to use an impact type grinding apparatus.

Examples of the impact type grinding apparatus include jet mills such as swirling flow powder collision type jet mills and powder collision type counter jet mills. The jet mill is an apparatus that allows a solid material to collide with each other through a high-speed jet stream using the air or the like as a medium, to provide fine particles. Examples of a method of precisely controlling the grinding include a method of adjusting the temperature, humidity, amount to be ground per unit time and the like upon the grinding.

Examples of a method of precisely classifying the ground product include a method of performing classification using a sieve (for example, a standard sieve of 325 mesh, 250 mesh or the like) or a classifying machine, or a method of performing classification through wind force depending on the specific gravity of particles, in order to obtain particulate objects with predetermined average particle diameters by the classification after the grinding. Examples of the classifying machine to be used include a wet-type classifying machine and a dry-type classifying machine, but a dry-type classifying machine is generally preferable. Examples of such a classifying machine include, but are not limited to, dry-type classifying apparatuses such as "Elbow-Jet" from Nittetsu Mining Co., Ltd., "Fine Sharp Separator" from HOSOKAWA MICRON CORPORATION, "Variable Impactor" from SANKYO DENGYO Corporation, "Spadic classifier" from SEISHIN ENTERPRISE Co., Ltd., "Donaselec" from NIPPON DONALDSON, LTD., "YM microcasette" from YASKAWA & CO., LTD., "Turbo Classifier" from NISSHIN ENGINEERING INC., other various air separators, micron separators, microplexes and Accu-Cut.

Examples of a method of directly providing particles, instead of grinding include a method of spray drying a solution of a curing agent for epoxy resins in which the block-like curing agent for epoxy resins is dissolved in a solvent. Specifically, example thereof include a method of uniformly dissolving the core (C) in an appropriate organic solvent, then spraying it in the solution state as fine droplets, and finally drying them through hot wind or the like. Examples of the drying apparatus in this case include a normal spray drying apparatus.

Examples thereof also include a method of uniformly dissolving the core (C) in an appropriate organic solvent, then adding a poor solvent for the core (C) while vigorously stirring the uniform solution to deposit the core (C) in the state of fine particles, filtering and separating the deposited particles, and finally drying and removing solvents at a low temperature of the melting point of the core (C) or below to obtain the core (C) with a desired particle diameter range.

Examples of a method of adjusting the average particle diameter of the core (C) in the particle state by an approach other than the classification include a method of adjusting the average particle diameter by mixing a plurality of particles having different average particle diameters. For example, in the case of a curing agent for epoxy resins with a large particle diameter, for which grinding and classification is hard, by adding another curing agent for epoxy resins with a small particle diameter and mixing them together, a curing agent for epoxy resins with an average particle diameter within the above-described range can be obtained. For the curing agent for epoxy resins obtained as such may be further classified as necessary.

Examples of such a mixing machine used for the purpose of mixing particulate matters include: a container rotary type mixing machine, which rotates the container itself in which particulate matters to be mixed are placed; a container fixed type mixing machine, which performs mixing through mechanical agitation or air flow agitation without rotating the container itself in which particulate matters are placed; and a complex mixing machine, which rotates the container in which particulate matters are placed and performs mixing also using another external force.

The shape of the core (C) is not particularly limited to the following, and may be any of, for example, spherical, granular, powdery, irregular and the like. Among these, the spherical shape is preferable from the viewpoint of lowering the viscosity of a one-part epoxy resin composition. Note that "spherical" also encompasses a shape in which irregular corners are rounded, not to mention an exact sphere.

The microcapsular curing agent (H) for epoxy resins preferably has a structure in which a curing agent for epoxy resins preferably having an average particle diameter of more than 0.3 μm and 12 μm or less is a core (C), and the surface of the core is covered with a shell (S) including a synthetic resin and/or an inorganic oxide.

Among these, from the viewpoint of the stability and breakability upon heating of the membrane constituting the shell (S), as well as uniformity of the cured product, it is preferable to include a synthetic resin.

Examples of the synthetic resin include, but are not limited to, epoxy resins, phenolic resins, polyester resins, polyethylene resins, nylon resins, polystyrene resins and urethane resins. Among these, preferable are epoxy resins, phenolic resins and urethane resins.

Examples of the epoxy resin used for the shell (S) include, but are not limited to, epoxy resins having two or more epoxy groups; resins produced by the reaction between an epoxy resin having two or more epoxy groups and a compound having two or more active hydrogens; and reaction products between a compound having two or more epoxy groups and a compound having one active hydrogen and a carbon-carbon double bond.

Among these, from the viewpoint of stability and fast curability at a low temperature, a resin produced by the reaction between a compound having two or more epoxy groups and a compound having two or more active hydrogens, in particular, a reaction product between an amine curing agent and an epoxy resin having two or more epoxy groups, is preferable. Among these, from the viewpoint of stability of the membrane and fast curability at a low temperature, a reaction product between an amine curing agent and an epoxy resin is preferable.

Examples of the phenolic resin include, but are not limited to, phenol-formaldehyde polycondensates, cresol-formaldehyde polycondensates, resorcinol-formaldehyde polycondensates, bisphenol A-formaldehyde polycondensates and polyethylenepolyamine-modified products of phenol-formaldehyde polycondensates.

Examples of the polyester resin include, but are not limited to, ethylene glycol-terephthalic acid-polypropylene glycol polycondensates, ethylene glycol-butylene glycol-terephthalic acid polycondensates and terephthalic acid-ethylene glycol-polyethylene glycol polycondensates.

Examples of the polyethylene resin include, but are not limited to, ethylene-propylene-vinyl alcohol copolymerized products, ethylene-vinyl acetate copolymerized products and ethylene-vinyl acetate-acrylic acid copolymerized products.

Examples of the nylon resin include, but are not limited to, adipic acid-hexamethylenediamine polycondensates, sebacic acid-hexamethylenediamine polycondensates and p-phenylenediamine-terephthalic acid polycondensates.

Examples of the polystyrene resin include, but are not limited to, styrene-butadiene copolymerized products, styrene-butadiene-acrylonitrile copolymerized products, acrylonitrile-styrene-divinylbenzene copolymerized products and styrene-propenyl alcohol copolymerized products.

Examples of the urethane resin include, but are not limited to, polycondensates of isocyanate monomers such as butyl isocyanate, cyclohexyl isocyanate, octadecyl isocyanate, phenyl isocyanate, tolylene diisocyanate, diphenylmethane diisocyanate, xylylene diisocyanate, hexamethylene diisocyanate, isophorone diisocyanate, tolidine diisocyanate, naphthalene diisocyanate and triphenylmethane triisocyanate, or condensates or polymers thereof with monoalcohols or polyhydric alcohols. Among these, a urethane resin that is an addition product of a monoalcohol or a polyhydric alcohol with a monoisocyanate or a polyfunctional isocyanate is preferable.

Examples of the inorganic oxide include, but are not limited to, boron compounds such as boron oxide and borate esters, silicon dioxide and calcium oxide. Among these, from the viewpoint of the stability and breakability upon heating of the membrane, boron oxide is preferable.

Moreover, the shell (S) constituting the microcapsular curing agent (H) for epoxy resins preferably includes a reaction product of any two or more of an isocyanate compound, an active hydrogen compound, a curing agent for epoxy resins, an epoxy resin and an amine compound.

The isocyanate compound may be the one included in the core (C) of the curing agent (H).

Examples of the active hydrogen compound include, but are not limited to, water, compounds having at least one primary amino group and/or secondary amino group, and compounds having at least one hydroxy group. In addition, one of these active hydrogen compounds may be used singly, or two or more active hydrogen compounds may be used in combination.

Examples of the compound having at least one primary amino group and/or secondary amino group include aliphatic amines, cycloaliphatic amines and aromatic amines.

Examples of the aliphatic amine include, but are not limited to, alkylamines such as methylamine, ethylamine, propylamine, butylamine and dibutylamine; alkylenediamines such as ethylenediamine, propylenediamine, butylenediamine and hexamethylenediamine; polyalkylenepolyamines such as diethylenetriamine, triethylenetetramine and tetraethylenepentamine; polyoxyalkylenepolyamines such as polyoxypropylenediamine and polyoxyethylenediamine.

Examples of the cycloaliphatic amine include, but are not limited to, cyclopropylamine, cyclobutylamine, cyclopentylamine, cyclohexylamine and isophoronediamine.

Examples of the aromatic amine include, but are not limited to, aniline, toluidine, naphthylamine, diaminodiphenylmethane and diaminodiphenylsulfone.

Examples of the compound having at least one hydroxy group include alcohol compounds and phenol compounds.

Examples of the alcohol compound include, but are not limited to, monoalcohols such as methyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, dodecyl alcohol, stearyl alcohol, eicosyl alcohol, allyl alcohol, crotyl alcohol, propargyl alcohol, cyclopentanol, cyclohexanol, benzyl alcohol, cinnamyl alcohol, ethylene glycol monomethyl ether, ethylene glycol monoethyl ether and diethylene glycol monobutyl ether; polyhydric alcohols such as ethylene glycol, polyethylene glycol, propylene glycol, polypropylene glycol, 1,3-butanediol, 1,4-butanediol, hydrogenated bisphenol A, neopentyl glycol, glycerin, trimethylolpropane and pentaerythritol; and polyhydric alcohols such as compounds having two or more secondary hydroxy groups per molecule, obtained by the reaction between a compound having at least one epoxy group and a compound having at least one hydroxy group, carboxy group, primary amino group, secondary amino group or thiol group. These alcohol compounds may be any of a primary alcohol, a secondary alcohol and a tertiary alcohol.

Examples of the phenol compound include, but are not limited to, monophenols such as carbolic acid, cresol, xylenol, carvacrol, thymol and naphthol; and polyhydric phenols such as catechol, resorcin, hydroquinone, bisphenol A, bisphenol F, pyrogallol, phloroglucin, 2-(dimethylaminomethyl)phenol and 2,4,6-tris(dimethylaminomethyl)phenol.

For these compounds having at least one hydroxy group, from the viewpoint of latency and solvent resistance, polyhydric alcohols and polyhydric phenols are preferable, and polyhydric alcohols are more preferable.

Reaction conditions for producing a reaction product of any two or more of an isocyanate compound, an active hydrogen compound, a curing agent for epoxy resins, an epoxy resin and an amine compound as a component of the shell (S) constituting the curing agent (H) as mentioned above are not particularly limited, and normally, the temperature range is −10° C. to 150° C. and the reaction time is 10 minutes to 12 hours.

The compounding ratio in the case where an isocyanate compound and an active hydrogen compound are used is preferably within a range of 1:0.1 to 1:1000 as (isocyanate groups in the isocyanate compound):(active hydrogens in the active hydrogen compound) (equivalent ratio).

The reaction may be performed in a predetermined dispersion medium as necessary.

Examples of the dispersion medium include solvents, plasticizing agents and resins.

Examples of the solvent include, but are not limited to, hydrocarbons such as benzene, toluene, xylene, cyclohexane, mineral spirit and naphtha; ketones such as acetone, methyl ethyl ketone (MEK) and methyl isobutyl ketone (MIBK); esters such as ethyl acetate, n-butyl acetate, propylene glycol monomethyl ether acetate; alcohols such as methanol, isopropanol, n-butanol, butyl cellosolve and butyl carbitol; and water. Examples of the plasticizing agent include, for example, phthalic acid diester plasticizing agents such as dibutyl phthalate and di(2-ethylhexyl) phthalate; aliphatic dibasic acid ester plasticizing agents such as di(2-ethylhexyl) adipate; phosphoric acid triester plasticizing agents such as tricresyl phosphate; and glycol ester plasticizing agents such as polyethylene glycol ester.

Examples of the resin include, but are not limited to, silicone resins, epoxy resins and phenolic resins.

Among the above, the reaction between the epoxy resin and the curing agents for epoxy resins is normally performed within a temperature range of −10° C. to 150° C., preferably 0° C. to 100° C. for a reaction time of 1 hour to 168 hours, preferably 2 hours to 72 hours. In addition, for the dispersion medium, a solvent or a plasticizing agent is preferable.

Note that the proportion of the reaction product as mentioned above in the shell (S) is normally 1% by mass or more, preferably 50% by mass or more, and may be 100% by mass.

In the microcapsular curing agent (H) for epoxy resins, examples of a method of forming the shell (S) covering the surface of the core (C) include the following methods (1) to (3).

(1) A method in which components of the shell (S) and particles of the curing agent for epoxy resins having an average particle diameter of greater than 0.3 μm and 12 μm or less are dissolved and dispersed in a solvent, which is a dispersion medium, and then, the solubility of the components of the shell (S) in the dispersion medium is reduced to deposit the shell (S) on the surface of particles of the curing agent for epoxy resins.

(2) A method in which particles of the curing agent for epoxy resins having an average particle diameter of more than 0.3 μm and 12 μm or less are dispersed in a dispersion medium, and materials for forming the above-described shell (S) are added to this dispersion medium to deposit the shell (S) on particles of the curing agent for epoxy resins.

(3) A method in which raw material components for forming the above-described shell (S) are added to a dispersion medium, and shell-forming materials are produced using the surface of particles of the curing agent for epoxy resins having an average particle diameter of more than 0.3 μm and 12 μm or less as the reaction site.

Here, the methods (2) and (3) are preferable because reaction and coverage can be performed at the same time.

Note that examples of the dispersion medium include solvents, plasticizing agents and resins.

Moreover, for the solvents, plasticizing agents and resins, those exemplified as examples of the solvent, plasticizing agent and resin that can be used for obtaining the above-mentioned reaction product of any two or more of an isocyanate compound, an active hydrogen compound, a curing agent for epoxy resins, an epoxy resin and an amine compound, can be used.

A method of separating the microcapsular curing agent (H) for epoxy resins from the dispersion medium after forming the shell (S) by the method (2) or (3) is not particularly limited, but it is preferable that unreacted starting materials after the shell (S) has been formed be separated and removed in combination with the dispersion medium. Examples of the method include a method of removing the dispersion medium and unreacted shell-forming materials through filtration.

It is preferable to wash the microcapsular curing agent (H) for epoxy resins after the dispersion medium is removed. By washing the microcapsular curing agent (H) for epoxy resins, unreacted shell (S)-forming materials that attach to the surface of the microcapsular curing agent (H) for epoxy resins can be removed.

A method of washing is not particularly limited, but washing can be performed using the dispersion medium or a solvent in which the microcapsular curing agent is not dissolved when the curing agent is in the state of the residue by filtration. By drying the microcapsular curing agent (H) for epoxy resins after performing filtration and washing, the microcapsular curing agent (H) for epoxy resins in the form of powder can be obtained. A method of drying is not particularly limited, but it is preferable to perform drying at a temperature of the melting point or the softening point of the amine curing agent for epoxy resins or below, and drying under reduced pressure is exemplified. By making the microcapsular curing agents (H) for epoxy resins powdery, the operation for compounding with the epoxy resin can be readily applied. In addition, it is suitable to use an epoxy resin as the dispersion medium because simultaneously with formation of the shell, a liquid resin composition consisting of the epoxy resin and the microcapsular curing agents (H) for epoxy resins can be obtained.

Note that the reaction of forming the shell (S) is normally performed within a temperature range of −10° C. to 150° C., preferably 0° C. to 100° C. for a reaction time of 10 minutes to 72 hours, preferably 30 minutes to 24 hours.

Furthermore, from the viewpoint of the balance between storage stability and reactivity, the shell (S) preferably has a urea bond group, which absorbs infrared ray with a wave number of 1630 to 1680 $cm^{-1}$, a biuret bond group, which absorbs infrared ray with a wave number of 1680 to 1725 $cm^{-1}$, and a urethane bond group, which absorbs infrared ray with a wave number of 1730 to 1755 $cm^{-1}$.

The urea bond group, biuret bond group and urethane bond group can be measured using a Fourier transform infrared spectrophotometer (hereinafter, may be referred to as "FT-IR"). In addition, whether the shell (S) has a urea bond group, a biuret bond group or a urethane bond group can be confirmed with microscopic FT-IR. Specifically, a liquid epoxy resin composition as the thermosetting resin composition of the present embodiment is cured at 40° C. for 12 hours using a modified aliphatic amine curing agent, and furthermore, the liquid epoxy resin composition is then cured completely at 120° C. for 24 hours. Subsequently, from the cured product, a sample with a thickness of 5 to 20 μm is produced using an ultramicrotome, and it is analyzed in the depth direction of the shell (S) with FT-IR. By observing the vicinity of the surface of the shell (S), the presence of a urea bond group, a biuret bond group or a urethane bond group can be observed.

Moreover, the thickness of the shell (S) is preferably 5 nm to 1000 nm, and more preferably 10 nm to 100 nm.

When the thickness of the shell (S) is 5 nm or more, the storage stability of the thermosetting resin composition of the present embodiment can be further improved. In addition, when the thickness of the shell (S) is 1000 nm or less, the curability can be further improved. Note that the thickness here means the average of layer thickness, which can be measured with a transmission electron microscope.

When the thermosetting resin composition of the present embodiment is an epoxy resin composition containing an epoxy resin and a curing agent, and the curing agent contains a microcapsular curing agents (H) for epoxy resins, then the content of the microcapsular curing agent (H) for epoxy resins in the epoxy resin composition relative to 100 parts by mass of the epoxy resin is not particularly limited, but is preferably 1 part by mass or more and 300 parts by mass or less, more preferably 5 parts by mass or more and 200 parts by mass or less, and further preferably 10 parts by mass or more and 150 parts by mass or less.

When the content of the microcapsular curing agent (H) for epoxy resins relative to 100 parts by mass of the epoxy resin is within the range above, while storage stability, fast curability at a low temperature and gap permeability are further improved, the adhesive strength and long term reliability of the cured product are also further improved.

The thermosetting resin composition of the present embodiment may further contain an organic filler and/or an inorganic filler as necessary.

Examples of the organic filler include, but are not limited to, one organic filler selected from the group consisting of thermoplastic resins and thermoplastic elastomers such as triblock copolymers, carbon fiber, cellulose, polyethylene powder and polypropylene powder.

Examples of the inorganic filler include, but are not limited to, fused silica, crystalline silica, alumina, talc, silicon nitride, aluminum nitride, coal tar, glass fiber, asbestos fiber, boron fiber, quartz powder, mineral silicate salts, mica, asbestos powder and slate powder.

These fillers have a function of altering the viscoelasticity of the thermosetting resin composition to optimize the viscosity, storage modulus and thixotropic properties, and further have functions of improving the fracture toughness of the cured product of the thermosetting resin composition and reducing its curing shrinkage.

The content of the filler in the thermosetting resin composition of the present embodiment is not particularly limited as long as it is within a range where effects of the present embodiment can be obtained. Normally, it is preferably 90% by mass or less of the thermosetting resin composition of the present embodiment. When the content of the filler is within the range above, the thermosetting resin composition tends to have a sufficiently low viscosity and an excellent handleability.

The thermosetting resin composition of the present embodiment can further include, besides the above-mentioned components, a diluting agent, a reactive diluting agent, a nonreactive diluting agent, a pigment, a dye, a flow modifier, a thickening agent, a reinforcement, a mold releasing agent, a wetting agent, a flame retardant, a surfactant, an organic solvent, an electrically conductive fine particle, a crystalline alcohol, a resin or the like as necessary.

For the diluting agent, without being limited to the following, for example, reactive diluting agents and nonreactive diluting agents can be used.

Examples of the reactive diluting agent include, but are not limited to, cresol, ethylphenol, propylphenol, p-butylphenol, p-amylphenol, hexylphenol, octylphenol, nonylphenol, dodecylphenol, octadecylphenol or terpenephenol.

Moreover, examples of the nonreactive diluting agent include, but are not particularly limited to, dioctyl phthalate, dibutyl phthalate and benzyl alcohol.

Examples of the pigment include, but are not limited to, kaolin, aluminum oxide trihydrate, aluminum hydroxide, chalk powder, gypsum, calcium carbonate, antimony trioxide, penton, silica, aerosol, lithopone, barite and titanium dioxide.

Examples of the dye include, but are not limited to, natural dyes including dyes derived from plants such as a madder and an indigo plant, and dyes derived from minerals such as loess and red clay, and synthetic dyes such as alizarin and indigo, as well as fluorescent dyes.

Examples of the flow modifier include, but are not limited to, silane coupling agents; organic titanium compounds such as titanium tetraisopropoxide and titanium diisopropoxybis (acetylacetonate); and organic zirconium compounds such as zirconium tetranormalbutoxide and zirconium tetraacetylacetonate.

Examples of the thickening agent include, but are not limited to, animal thickening agents such as gelatin; plant thickening agents such as polysaccharides and cellulose; and chemical synthetic thickening agents such as polyacrylic, modified polyacrylic, polyether, urethane-modified polyether and carboxymethyl cellulose.

Examples of the reinforcement include, but are not limited to, polyethylenesulfone powders such as "SUMIKAEXCEL PES" from Sumitomo Chemical Co., Ltd.; nano-sized, functional group-modified core shell rubber particles such as "Kane Ace MX" from KANEKA CORPORATION; and silicone reinforcements such as polyorganosiloxane.

Examples of the mold releasing agent include, but are not limited to, fluorine mold releasing agents; silicone mold releasing agents; and acrylic mold releasing agents composed of a copolymer of glycidyl (meth)acrylate and a $C_{16-22}$ linear alkyl (meth)acrylate ester.

Examples of the wetting agent include, but are not limited to, unsaturated polyester copolymer wetting agents having an acidic group such as acrylic polyphosphate esters.

Examples of the flame retardant include, but are not limited to, metal hydroxides such as aluminum hydroxide and magnesium hydroxide; halogen flame retardants such as chlorine compounds and bromine compounds; phosphorus flame retardants such as condensed phosphate esters; antimony flame retardants such as antimony trioxide and antimony pentoxide; and inorganic oxides such as silica fillers.

Examples of the surfactant include, but are not limited to, anionic surfactants such as alkyl benzenesulfonic acid salts and alkyl polyoxyethylene sulfuric acid salts; cationic surfactants such as alkyl dimethyl ammonium salts; amphoteric surfactants such as alkyl dimethyl amine oxide and alkyl carboxy betaine; nonionic surfactants such as linear alcohols and fatty acid esters having 25 or more carbon atoms.

Examples of the organic solvent include, but are not limited to, toluene, xylene, methyl ethyl ketone (MEK), methyl isobutyl ketone (MIBK), ethyl acetate and butyl acetate.

Examples of the electrically conductive fine particle include, but are not limited to, carbon black, graphite, carbon nanotube, fullerene, iron oxide, gold, silver, aluminum powder, iron powder, nickel, copper, zinc, chromium, solder, nano-sized metal crystals and intermetallic compounds.

Examples of the crystalline alcohol include, but are not limited to, 1,2-cyclohexanediol, 1,3-cyclohexanediol, 1,4-cyclohexanediol, pentaerythritol, sorbitol, cane sugar and trimethylolpropane.

Examples of the resin include, but are not limited to, polyester resins, polyurethane resins, acrylic resins, polyether resins and melamine resins, as well as modified epoxy resins such as urethane-modified epoxy resins, rubber-modified epoxy resins and alkyd-modified epoxy resins.

These components to be added can be added at a functionally equivalent amount, and for example, a pigment and/or a dye are added to the epoxy resin composition of the present embodiment in an amount such that a desired color can be imparted.

In the epoxy resin composition of the present embodiment, the total amount of the additives is preferably 0 to 20% by mass, more preferably 0.5 to 5% by mass, and further preferably 0.5 to 3% by mass.

[Applications]

It is preferable that the thermosetting resin composition of the present embodiment include the above-mentioned microcapsular curing agent (H) for epoxy resins.

The thermosetting resin composition of the present embodiment can be, for example, pasty or film-like, can be processed into a desired shape as necessary, and can be utilized in all sorts of applications (processed goods, etc.)

In particular, the thermosetting resin composition of the present embodiment can be suitably used as an adhesive, a bonding paste, an electrically conductive material, an anisotropic electrically conductive material, an insulating material, a sealing material, a coating material, a paint composition, a prepreg, a thermally conductive material, a separator material for fuel cells, an overcoat material for flexible circuit boards and the like.

Hereinafter, description will be given in detail.

The adhesive and the bonding paste are useful for, without being limited to the following, liquid adhesives, film-like adhesives and die bonding materials.

A method of producing the liquid adhesive is not particularly limited, and known methods can also be employed. Examples thereof include a method described in Japanese Patent Laid-Open No. 2000-319620.

Examples thereof a method as follows. First, 100 parts by mass of a bisphenol A epoxy resin as an epoxy resin, 10 parts by mass of polymethacrylate (average particle diameter: 1 μm) as a particulate thermosetting resin, and 10 parts by mass of isophthalic acid dihydrazide having an average particle diameter of 2 μm as a particulate curing agent are compounded and kneaded with a mixer. Into this, the thermosetting resin composition of the present embodiment is added and dispersed such that its concentration is 30% by mass, and the liquid adhesive can thus be obtained.

Examples of the electrically conductive material include, but are not limited to, electrically conductive films and electrically conductive pastes.

Other than anisotropic electrically conductive films, examples of the anisotropic electrically conductive material include, but are not particularly limited to, anisotropic electrically conductive pastes.

A method of producing the electrically conductive material is not particularly limited, and known methods can also be employed. Examples thereof include a method described in Japanese Patent Laid-Open No. 2000-021236. More specifically, examples thereof include a method in which an electrically conductive material used for the anisotropic electrically conductive film, such as solder particles; nickel particles; nano-sized metal crystals; particles obtained by covering the surface of a metal with another metal; gradient particles of copper and silver; and particles obtained by covering particles of a resin such as a styrene resin, a urethane resin, a melamine resin, an epoxy resin, an acrylic resin, a phenolic resin and a styrene-butadiene resin with an electrically conductive thin film of gold, nickel, silver, copper, solder or the like, is made into spherical fine particles with a size of approximately 1 to 20 μm; to these particles, the thermosetting resin composition of the present embodiment is added; another solid epoxy resin, epoxy resin or the like is added as necessary; and mixing and dispersing is performed with a three-roller dispersing machine to obtain the anisotropic electrically conductive paste.

Examples of the insulating material include, but are not limited to, insulating adhesive films and insulating adhesive pastes. The insulating adhesive film, which is an insulating material, can be obtained by using the above-mentioned bonding film. In addition, by compounding an insulating filler into the thermosetting resin composition of the present embodiment, the insulating adhesive paste can be obtained.

Examples of the sealing material include, but are not limited to, solid sealing materials, liquid sealing materials and film-like sealing materials. Among these, the liquid sealing material is useful as an underfill material, a potting material or a dam material.

A method of producing the sealing material is not limited to the following, and known methods can also be employed. Examples thereof include methods described in Japanese Patent Laid-Open No. H05-043661 and Japanese Patent Laid-Open No. 2002-226675. More specifically, the sealing material can be obtained by uniformly mixing a bisphenol A epoxy resin and spherical fused silica powder, adding the thermosetting resin composition of the present embodiment to this, and mixing the resultant uniformly.

Examples of the coating material include, but are not limited to, coating materials for electronic materials, overcoat materials for covering printed circuit boards, and resin compositions for interlayer insulation of printed boards.

A method of producing the coating material is not particularly limited, and known methods can be employed. Examples thereof include methods described in Japanese Patent Publication No. H04-006116, Japanese Patent Laid-Open No. H07-304931, Japanese Patent Laid-Open No. H08-064960, Japanese Patent Laid-Open No. 2003-246838 and the like. More specifically, a filler of silica and a bisphenol A epoxy resin, as well as a phenoxy resin, a rubber-modified epoxy resin and the like are compounded. To this, the thermosetting resin composition of the present embodiment is further compounded, and a 50% solution of the resultant is prepared with methyl ethyl ketone (MEK) to obtain the coating material.

The coating material obtained is applied onto the surface of a polyimide film or the like to a thickness of 50 μm, and then, by drying MEK, a coated material can be obtained. The film coated as such and a copper foil are superposed and laminated at 60 to 150° C. Then, by heat curing the resulting laminate at 180 to 200° C., a laminated plate having the interlayer coated with the coating material can be obtained.

A method of producing the paint composition is not particularly limited, and known methods can be employed. Examples thereof include methods described in Japanese Patent Laid-Open No. H11-323247, Japanese Patent Laid-Open No. 2005-113103 and the like. More specifically, to a bisphenol A epoxy resin, titanium dioxide, talc and the like are compounded, and a 1:1 mixed solvent of methyl isobutyl ketone (MIBK)/xylene is added, stirred and mixed to obtain a base resin. By adding the epoxy resin composition to this and making it dispersed uniformly, the paint composition can be obtained.

A method of producing the prepreg is not particularly limited, and known methods can be employed. Examples thereof include methods described in Japanese Patent Laid-Open No. H09-071633, International Publication No. WO 98/044017 and the like. More specifically, examples thereof include a method of impregnating a reinforcing substrate with the thermosetting resin composition of the present embodiment and heating the resultant to obtain the prepreg. Upon the impregnation, a varnish solvent can be used, and examples of the solvent include methyl ethyl ketone (MEK), acetone, ethyl cellosolve, methanol, ethanol and isopropyl alcohol. It is preferable that these solvents do not remain in the prepreg. Although the type of the reinforcing substrate is not particularly limited, but examples thereof include paper, glass cloth, nonwoven glass fabric, aramid cloth and liquid crystal polymers.

The proportion of the thermosetting resin composition component of the present embodiment and the reinforcing substrate is not particularly limited either, but normally, the prepreg is preferably prepared such that the thermosetting resin composition component therein is 20 to 80% by mass.

A method of producing the thermally conductive material is not particularly limited, and known methods can be employed. Examples thereof include methods described in Japanese Patent Laid-Open No. H06-136244, Japanese Patent Laid-Open No. H10-237410, Japanese Patent Laid-Open No. 2000-003987 and the like. More specifically, an epoxy resin as a thermosetting resin, a phenol novolac curing agent as a curing agent, and graphite powder as a thermally conductive filler are compounded and kneaded uniformly.

A method of producing the separator material for fuel cells is not particularly limited, and known methods can be employed. Examples thereof include methods described in Japanese Patent Laid-Open No. 2002-332328, Japanese Patent Laid-Open No. 2004-075954 and the like. More specifically, using artificial graphite material as an electrically conductive material, and an epoxy resin, a biphenyl epoxy resin, a resol phenolic resin or a novolac phenolic resin as a thermosetting resin, the starting materials are mixed with a mixer. By adding the thermosetting resin composition of the present embodiment to the mixture obtained and making it dispersed uniformly, a molding material composition of a seal material for fuel cells can be obtained. Then, by compression-molding this molding material composition of a seal material for fuel cells at a mold temperature of 170 to 190° C. and a molding pressure of 150 to 300 kg/cm$^2$, a separator material for fuel cells that has an excellent electrical conductivity, a satisfactory gas impermeability and an excellent molding processability can be obtained.

A method of producing the overcoat material for flexible circuit boards is not particularly limited, and known methods can be employed. Examples thereof include methods described in International Publication No. WO 00/064960, Japanese Patent Laid-Open No. 2006-137838 and the like.

More specifically, an epoxy resin, a carboxy-modified polybutadiene that is to react with the epoxy resin, rubber particles and the like are appropriately added to prepare an overcoat material for flexible circuit boards. To this, the thermosetting resin composition of the present embodiment is added as a curing accelerator and dispersed uniformly. The resultant was dissolved and dispersed in MEK (methyl ethyl ketone) to prepare a solution of an overcoat material for flexible circuit boards with a solid concentration of 30% by mass. Furthermore, succinic acid, as a dicarboxylic acid, is dissolved in pure water and the resultant solution, as a 5% by mass aqueous solution, is added to the solution of an overcoat material for flexible circuit boards. To a polyimide film having a thickness of 65 μm, the solution of an overcoat material for flexible circuit boards is applied to provide a dry film thickness of 25 μm, and then dried at 150° C. for 20 minutes. In this way, the overcoat material for flexible circuit boards can be obtained.

EXAMPLES

Hereinafter, the present embodiment will be described with reference to specific Examples and Comparative Examples thereto, but the present embodiment is not limited to the following Examples.

Measuring methods applied in Examples and Comparative Examples are shown below.

In the following, a "part(s)" is on the basis of mass unless otherwise noted.

[(1) Storage Stability]

A thermosetting resin composition obtained in Examples and Comparative Examples, which will be mentioned later, was stored at 40° C. for one week. The viscosities before and after the storage were measured using a BM type viscometer (25° C.)

The proportion of the viscosity of the thermosetting resin composition after the storage to the viscosity of the thermosetting resin composition before the storage (viscosity rise ratio) (=viscosity after storage/viscosity before storage) was calculated, and storage stability was evaluated based on the following criteria.

A: the case where the viscosity rise ratio was less than 2.
B: the case where the viscosity rise ratio was 2 or more and less than 5.
C: the case where the viscosity rise ratio was 5 or more and less than 10.
D: the case where the viscosity rise ratio was 10 or more.
E: the case where the epoxy resin composition was solidified after the storage, and the viscosity measurement was thus not possible.

[(2) Curability of Thermosetting Resin Composition at 130° C.]

A thermosetting resin composition obtained in Examples and Comparative Examples, which will be mentioned later, was retained in an oven at 130° C. for 15 minutes and allowed to cure.

Calorimetry was performed with DSC6220, and the proportion of the remaining calorific value of the cured piece after the curing to the calorific value of the thermosetting resin composition before the curing (=(remaining calorific value of cured piece after curing/calorific value of thermosetting resin composition before curing)×100) was calculated and evaluated according to the following criteria.

A: remaining calorific value after curing of less than 10%
B: from 10 to less than 20%
C: from 20 to less than 30%
D: 30% or more

[(3) Measurement of Moisture Absorptivity of Thermosetting Resin Composition]

A thermosetting resin composition obtained in Examples and Comparative Examples, which will be mentioned later, was retained in an oven at 130° C. for 15 minutes and allowed to cure, and 5 test pieces (4 cm×4 cm×0.5 cm) were produced therefrom and their masses were measured.

Then, the test pieces were placed in a thermo-hygrostat machine at 85° C. and 85 RH % for 168 hours, and the mass increase was measured and the moisture absorptivity was calculated.

[(4) Light Transmittance of Cured Product of Thermosetting Resin Composition]

The distance between two glass plates with a thickness of 1 mm was adjusted with a spacer with a thickness of 1 mm. A thermosetting resin composition before curing obtained in Examples and Comparative Examples, which will be mentioned later, was introduced therebetween and heat cured at 130° C. for 15 minutes. Then using the plate-like cured product of the thermosetting resin composition with a thickness of 1 mm, sandwiched between the glass plates, the light transmittance was measured with a spectrophotometer (from JASCO Corporation, V-660) without removing the cured product from the glass plates.

In the measuring method, the baseline was prepared at the blank state, and subsequently, the cured product sample sandwiched between the glass plates was set on the sample side and two glass plates with a 1 mm gap provided by a spacer were set on the reference side. Then, the light transmittance at each wavelength of 700 nm, 380 nm and 400 nm was measured.

In addition, a ratio of light transmittance at 700 nm/light transmittance at 380 nm and a ratio of light transmittance at 700 nm/light transmittance at 400 nm were calculated, and because the ratios of the light transmittances were 2 or less, the variation of the curing domain was judged to be absent within the size of light wavelengths transmitted.

[(5) Heat Resistance Test of Cured Product of Thermosetting Resin Composition]

The cured product of the thermosetting resin composition, produced in the above (4), was placed in an oven at 150° C. and heated. After 168 hours, the light transmittance at a wavelength of 450 nm was measured to calculate (light transmittance before heating)–(light transmittance after heating), and heat resistance was evaluated based on the following criteria.

A: decline in light transmittance before and after heating of less than 10%

B: from 10 to less than 20%

C: from 20 to less than 30%

D: decline of 30% or more

Note that when the initial transmittance was 30% or less, "-" was given.

[(6) Adhesiveness to Polyimide Film (Peel Strength Test)]

Onto a glass cloth-epoxy board (20 cm×20 cm×1.5 mm) (from NIHON-MULTI Corporation, FR-4), a thermosetting resin composition obtained in Examples and Comparative Examples was dropped, and then, a polyimide film (from DU PONT-TORAY CO., LTD., Kapton 500H) cut into 20 cm×20 cm×125 μm was placed thereon, and curing was performed under a pressure of 2.5 kg/cm$^2$ and at a temperature condition of 130° C. for 15 minutes to obtain a formed product.

The formed product was cut into a width of 2 cm and processed such that a 1 cm-wide Kapton film was left at the center in accordance with JIS C6484, and using AGS-H5 kN (from Shimadzu Corp.), 90 degree peel strength measurement was carried out.

A larger numerical value of the measurement was estimated to exhibit a higher strength and be effective.

[(7) Adhesiveness to Liquid Crystal Polymer (Shear Adhesive Strength with Liquid Crystal Polymer)]

A thermosetting resin composition produced in Examples and Comparative Examples, which will be mentioned later, was cured under conditions of 130° C. and 15 minutes to obtain a cured product.

Using the cured product as a subject, the tensile shear adhesive strength was measured in accordance with JIS K6850.

For the adherent, SUMIKASUPER E6007 LHF (from Sumitomo Chemical Co., Ltd.) was used.

A larger numerical value of the measurement was estimated to exhibit a higher strength and be effective.

[(8) Retention Rate of Shear Adhesive Strength Before and after Moisture Absorption)]

A thermosetting resin composition produced in Examples and Comparative Examples, which will be mentioned later, was used to produce a test piece in accordance with JIS K6850.

In addition, for the adherent constituting the test piece, an adherent (cold rolled steel plate) with a width of 25 mm×a length of 100 mm×a thickness of 1.6 mm was used in accordance with JIS C3141.

In a compact high temperature chamber ST-110B2 from ESPEC CORP. with a stable internal temperature of 130° C., the uncured test piece was placed and heated for 15 minutes to cure, and a test piece for shear adhesive strength measurement was obtained.

After 15 minutes, the test piece for shear adhesive strength measurement was taken out from the compact high temperature chamber, left under a room temperature environment, and cooled to room temperature.

After cooling to room temperature, by using AGX-5kNX from Shimadzu Corp. with a load cell of 5 kN and at a rate of 5 mm/min, the maximum load was measured where the adhesion surface of the test piece for shear adhesive strength measurement was ruptured and the test piece for shear adhesive strength was separated, and the shear adhesive strength was determined as a value obtained by dividing the maximum load at which the separation occurred by the adhesion area.

When the shear adhesive strength immediately after the heat curing was less than 9 MPa, the shear adhesive strength immediately after the curing was evaluated to be insufficient and "E" was given, and no more evaluation was performed.

For test pieces of Examples and Comparative Examples having a shear adhesive strength immediately after the curing of 9 MPa or more, the test piece for shear adhesive strength measurement immediately after the curing was stored under environments with a temperature of 85° C. and a relative humidity of 85% for 7 days with a thermo-hygrostat machine, PR-1KT from ESPEC CORP. to perform moisture absorption treatment.

Comparing the shear adhesive strength immediately after the curing and the shear adhesive strength after storing the test piece under said environments and performing the moisture absorption treatment, the retention rate of shear adhesive strength after moisture absorption was determined by dividing the shear adhesive strength after the moisture absorption treatment by the shear adhesive strength immediately after the curing and multiplying the resultant by 100, and was evaluated according to the criteria described below.

When the retention rate was less than 50%, "C" was given.

When the retention rate was 50% or more and less than 60%, "B" was given.

When the retention rate was 60% or more, "A" was given.

Production Example 1

(Production of Curing Agent Containing Amine Adduct (AD-1) and Corresponding Amine (A))

To 680 g of a solution in which 1-butanol and toluene were mixed at a proportion of 1/1 (mass ratio), 557 g of N,N-dimethylaminopropylamine (molecular weight 102) was added as an amine compound (A), and the resultant mixture was stirred to produce a uniform solution.

Next, in 386 g of a solution in which 1-butanol and toluene were mixed at a proportion of 1/1 (mass ratio), 1567 g (8.38 equivalents in terms of Ep equivalent) of a bisphenol A epoxy resin (from ASAHI KASEI E-materials Corp., "AER 2603", epoxy equivalent: 187 g/eq, total chlorine content: 1800 ppm, hydrolyzable chlorine content: 50 ppm) was dissolved as an epoxy compound (B1) to produce a solution of the bisphenol A epoxy resin.

In a reactor vessel equipped with a stirrer, a condenser and an oil bath for controlling the temperature, the solution of the bisphenol A epoxy resin was added dropwise over 7 hours to the N,N-dimethylaminopropylamine solution, using an equal pressure dropping funnel, within an internal temperature range of 50 to 90° C.

After the completion of the dropping, the resultant reaction solution was heated at 80° C. for 5 hours to adjust the structure of an amine adduct.

Subsequently, the temperature of the reaction solution was further elevated to 100° C., and then, while gradually reducing the pressure, a part of the solvent was distilled off from the reaction solution.

Subsequently, the temperature of the reaction solution was further elevated to 120° C., and by reducing the pressure in the reactor vessel until the pressure becomes 10 mmHg or less, unreacted N,N-dimethylaminopropylamine was distilled off along with the residual solvent from the reaction solution to obtain 2008 g of a curing agent (I) consisting of an amine adduct (AD-1 (DMAPA adduct)) and unreacted N,N-dimethylaminopropylamine as the amine compound (A).

The curing agent (I) in Production Example 1 is defined as a curing agent (I-1).

The content of unreacted N,N-dimethylaminopropylamine in the curing agent (I-1) was 0.07% by mass.

Production Example 2

(Production of Curing Agent Containing Amine Adduct (AD-2) and Corresponding Amine (A))

In a mixed solution of 100 g of xylene and 100 g of isopropyl alcohol, 103 g of diethylenetriamine (molecular weight: 103) was dissolved as an amine compound (A). Then, 189 g of a bisphenol A epoxy resin (from ASAHI KASEI E-materials Corp., "AER 2603", epoxy equivalent: 189, total chlorine content: 1800 ppm, hydrolyzable chlorine content: 50 ppm) was added as an epoxy compound (e1) at 60 to 100° C. and allowed to react.

Next, by heating and depressuring the reaction liquid, the solvents, xylene and isopropyl alcohol, were distilled off from the reaction liquid to obtain 265 g of a curing agent (I) consisting of an amine adduct (AD-2 (DETA adduct)) and unreacted diethylenetriamine as the amine compound (A).

The curing agent (I) in Production Example 2 is defined as a curing agent (I-2).

The content of unreacted diethylenetriamine was 0.005% by mass.

Production Example 3

(Production of Curing Agent Containing Amine Adduct (AD-3) and Corresponding Amine (A))

Diethylenetriamine was changed to tetraethylenetriamine.

For the other conditions, production was performed in the same way as [Production Example 2] to obtain 293 g of a curing agent (I) consisting of an amine adduct (AD-3 (TETA adduct)) and unreacted tetraethylenetriamine as an amine compound (A).

The curing agent (I) in Production Example 3 is defined as a curing agent (I-3).

The content of unreacted tetraethylenetriamine was 0.007% by mass.

Production Example 4

(Production of Amine Adduct (AD-4))

103 g of diethylenetriamine was changed to 55 g of 2-ethyl-4-methylimidazole. For the other conditions, production was performed in the same way as [Production Example 2] to obtain 258 g of an adduct product of imidazole (h1-1) (Iz adduct) as an amine adduct (AD-4).

Production Example 5

(Production of Core of Curing Agent for Thermosetting Resins (C-1))

Into a flask, 180 g of the curing agent (I-1) and 20 g of triethylenediamine (molecular weight: 112, number of tertiary amino groups: 2, molecular weight per tertiary amino group: 56, melting point: 156° C.) as the curing agent (h1) were charged, and stirring and mixing were performed until the mixture became uniform while heating at 150° C.

Subsequently, the resultant was collected and cooled to obtain a curing agent for thermosetting resins in the solid state at room temperature.

The obtained curing agent for thermosetting resins was roughly ground with a grinding machine "Rotoplex" (from HOSOKAWA MICRON CORPORATION) until the average particle diameter reached approximately 0.1 to 2 mm to obtain a roughly ground product.

The resulting, roughly ground product was fed to an air flow jet mill (from NISSHIN ENGINEERING INC., "CJ25 model") at a feed rate of 5.0 kg/hr and grinding at a grinding pressure of 0.6 MPa·s was repeated twice. Then, classification was performed with an air classifying machine (from NISSHIN ENGINEERING INC., "Turbo Classifier") to remove coarse particles, and the resulting finely ground product was obtained as a curing agent for thermosetting resins.

This core of the curing agent for thermosetting resins (C-1) obtained had an average particle diameter of 3.5 µm.

Production Examples 6 to 16

(Production of Cores of Curing Agent for Thermosetting Resins (C-2) to (C-12))

Following Table 1, production was carried out in the same way as the above [Production Example 5] to obtain cores of the curing agent for thermosetting resins (C-2 to 12).

The components of the cores of the curing agent for thermosetting resins (C-1) to (C-12) are shown in Table 1 described below.

Note that, for the materials shown in Table 1, the following was used.

HN-5500 (molecular weight: 168, from Hitachi Chemical Co., Ltd.)

Triethylenediamine (molecular weight: 112.2, reagent of Wako)

Salicylic acid hydrazide (molecular weight: 152.2, from Otsuka Chemical Co., Ltd.)

Isophthalic acid hydrazide (molecular weight: 194.2, from Otsuka Chemical Co., Ltd.)

1,2,4-Triazole (molecular weight: 70, from Otsuka Chemical Co., Ltd.)

N,N-Dimethylcyclohexylamine (molecular weight: 127.2, reagent of Tokyo Chemical Industry Co., Ltd.)

Phenolic resin PS-4326 (molecular weight: 2000, from Gunei Chemical Industry Co., Ltd.)

U-CAT SA1 (DBU-phenol salt, molecular weight: 360, from San-Apro Ltd.)

TABLE 1

|  |  | C-1 | C-2 | C-3 | C-4 | C-5 | C-6 | C-7 | C-8 | C-9 | C-10 | C-11 | C-12 |
|---|---|---|---|---|---|---|---|---|---|---|---|---|---|
| Curing agent (I) (parts by mass) | I-1 | 90 | 50 | 50 |  | 90 | 50 | 45 | 100 |  |  |  |  |
|  | I-2 |  | 40 |  | 50 |  | 20 |  |  |  |  | 83 | 5 |
|  | I-3 |  |  | 30 |  |  |  |  |  |  |  |  |  |
| Curing agent (II) (parts by mass) | HN5500 |  |  |  |  |  |  |  |  | 96 |  |  |  |
|  | h-1 (Iz adduct) |  |  |  |  | 5 |  |  |  |  | 100 | 8.5 | 70 |
|  | Triethylenediamine | 10 | 10 | 5 |  | 5 |  | 10 |  |  |  |  |  |
|  | Salicylic acid hydrazide |  |  | 10 | 40 |  | 10 |  |  |  |  |  | 25 |
|  | Isophthalic acid hydrazide |  |  |  | 10 |  |  |  | 25 |  |  |  |  |
|  | 1,2,4-Triazole |  |  | 5 |  |  |  |  | 20 |  |  |  |  |
|  | 1,2-Methylimidazole |  |  |  |  |  |  |  |  |  |  | 8.5 |  |
|  | N,N-Dimethylcyclohexylamine |  |  |  |  |  | 15 |  |  |  |  |  |  |
|  | Phenolic resin (PS-4326) |  |  |  |  |  | 5 |  |  |  |  |  |  |
|  | U-CAT SA1 |  |  |  |  |  |  | 4 |  |  |  |  |  |
| Average particle diameter (µm) |  | 3.5 | 4.5 | 3.7 | 3.6 | 4.6 | 3.4 | 5.2 | — | 3.5 | 2.8 | 2.9 | 3.2 |

Example 1

Into 140 g of methylcyclohexane, 70 g of the core of the curing agent for thermosetting resins (C-1) was added and dispersed in methylcyclohexane. Then, 4.0 g of water, 25.2 g of isophorone diisocyanate and 6.0 g of a bisphenol A epoxy resin (from ASAHI KASEI E-materials Corp., "AER 2603", epoxy equivalent: 189, total chlorine content: 1800 ppm, hydrolyzable chlorine content: 50 ppm) as an epoxy resin were added, and the resultant mixture was allowed to react at 50° C. for 4 hours.

After the reaction ended, filtration, washing and drying were performed to obtain a microcapsular curing agent for epoxy resins (H-1).

Using the curing agent (H-1) for microcapsular epoxy resins obtained, a thermosetting resin composition was produced following Table 2, and the above-described evaluation was then performed.

Example 2

Into 150 g of a bisphenol A epoxy resin (from ASAHI KASEI E-materials Corp., "AER 2603", epoxy equivalent: 189, total chlorine content: 1800 ppm, hydrolyzable chlorine content: 50 ppm) as an epoxy resin, 100 g of the core of the curing agent for thermosetting resins (C-2) was added and dispersed therein. Then, 1.0 g of water and 5.5 g of tolylene diisocyanate were added, and the resultant mixture was allowed to react at 40 to 50° C. for 3 hours.

Subsequently, while washing with xylene, filtration and separation were performed, and by drying the resultant, a curing agent (H-2) for microcapsular epoxy resins was obtained.

Using the curing agent (H-2) for microcapsular epoxy resins obtained, a thermosetting resin composition was produced following Table 2, and the above-described evaluation was then performed.

[Examples 3 to 9], [Comparative Examples 1 to 3]

Instead of the core of the curing agent for thermosetting resins (C-1), using the cores of the curing agent for thermosetting resins (C-3) to (C-12), production was performed in the same way as [Example 1] to obtain microcapsular curing agents for epoxy resins (H-3) to (H-12).

Using the curing agents obtained, thermosetting resin compositions were produced following Table 2, and the above-described evaluation was then performed.

Examples 10 to 12

Mixing and using a microcapsular curing agent (H) for epoxy resins and a curing agent (h) for non-microcapsular, thermosetting resin compositions were produced following Table 2, and the above-described evaluation was then performed.

For the materials shown in Table 2, the following was used.

(Epoxy Resin)
Bisphenol A epoxy: AER 2603 (from ASAHI KASEI)
Bisphenol F epoxy: EPICLON 830 (from DIC CORPORATION)
(Curing Agent (h))
h-1: dicyandiamide (from TCI)
h-2: salicylic acid hydrazide (from TCI)
h-3: isophthalic acid hydrazide (from TCI)

TABLE 2

|  | Foreign application | | | | | | | |
|---|---|---|---|---|---|---|---|---|
|  | Example 1 | Example 2 | Example 3 | Example 4 | Example 5 | Example 6 | Example 7 | Example 8 |
| Curing Agent (H) type | H-1 | H-2 | H-3 | H-4 | H-5 | H-6 | H-7 | H-8 |
| Curing Agent (h) type |  |  |  |  |  |  |  |  |
| Bisphenol A epoxy (parts by mass) | 100 | 50 |  | 100 | 100 | 100 |  | 50 |
| Bisphenol F epoxy (parts by mass) |  | 50 | 100 |  |  |  | 100 | 50 |
| Amount of curing agent (H) (parts by mass) | 40 | 40 | 30 | 30 | 30 | 40 | 20 | 100 |
| Amount of curing agent (h) (parts by mass) |  |  |  |  |  |  |  |  |
| Measurement of moisture absorptivity (%) | 1.9 | 1.9 | 2.1 | 2.4 | 1.8 | 2.2 | 2.4 | 2.5 |
| (1) Light transmittance at 700 nm (%) | 84 | 86 | 85 | 87 | 76 | 79 | 78 | 82 |
| (2) Light transmittance at 380 nm (%) | 64 | 65 | 61 | 66 | 43 | 51 | 42 | 45 |
| (3) Light transmittance at 400 nm (%) | 76 | 79 | 78 | 79 | 70 | 65 | 72 | 79 |
| (1)/(2) | 1.31 | 1.32 | 1.39 | 1.32 | 1.77 | 1.55 | 1.86 | 1.82 |
| (1)/(3) | 1.11 | 1.09 | 1.09 | 1.10 | 1.09 | 1.22 | 1.08 | 1.04 |

TABLE 2-continued

|  | | | | | | | | |
|---|---|---|---|---|---|---|---|---|
| Storage stability | B | A | A | B | B | D | D | D |
| Curability at 130° C. | A | A | A | C | A | B | A | C |
| Heat resistance test | A | B | B | B | C | B | C | B |
| Peel strength test (N/mm2) | 2.5 | 2.4 | 2.2 | 2.1 | 1.6 | 1.7 | 1.9 | 1.6 |
| Shear adhesive strength to liquid crystal polymer (N/mm2) | 12.1 | 11.9 | 11.4 | 10.4 | 10.1 | 10.2 | 11.2 | 7.1 |
| Retention rate of shear adhesive strength before and after moisture absorption | A | A | A | B | A | B | B | D |

| | Foreign application | | | | | | |
|---|---|---|---|---|---|---|---|
| | Example 9 | Example 10 | Example 11 | Example 12 | Comparative Example 1 | Comparative Example 2 | Comparative Example 3 |
| Curing Agent (H) type | H-11 | H-1 | H-4 | H-5 | H-9 | H-10 | H-12 |
| Curing Agent (h) type | | h-1 | h-2 | h-3 | | | |
| Bisphenol A epoxy (parts by mass) | 100 | 100 | 100 | 50 | 100 | 100 | 50 |
| Bisphenol F epoxy (parts by mass) | | | | 50 | | | 50 |
| Amount of curing agent (H) (parts by mass) | 30 | 35 | 27 | 20 | 30 | 30 | 30 |
| Amount of curing agent (h) (parts by mass) | | 5 | 3 | 10 | | | |
| Measurement of moisture absorptivity (%) | 2.1 | 2.1 | 2.5 | 1.8 | 2.6 | 1.4 | 1.7 |
| (1) Light transmittance at 700 nm (%) | 77 | 85 | 88 | 80 | 84 | 67 | 71 |
| (2) Light transmittance at 380 nm (%) | 38 | 67 | 70 | 51 | 52 | 0.1 | 20 |
| (3) Light transmittance at 400 nm (%) | 58 | 79 | 81 | 76 | 74 | 19 | 35 |
| (1)/(2) | 2.03 | 1.27 | 1.26 | 1.57 | 1.62 | 670.00 | 3.55 |
| (1)/(3) | 1.33 | 1.08 | 1.09 | 1.05 | 1.14 | 3.53 | 2.03 |
| Storage stability | A | B | B | B | A | A | B |
| Curability at 130° C. | B | A | B | A | D | A | B |
| Heat resistance test | D | A | B | B | C | — | C |
| Peel strength test (N/mm2) | 1.3 | 2.8 | 2.2 | 1.7 | 0.7 | 1.2 | 1.2 |
| Shear adhesive strength to liquid crystal polymer (N/mm2) | 9.5 | 14.3 | 11.5 | 11.2 | 2.8 | 6.7 | 6.8 |
| Retention rate of shear adhesive strength before and after moisture absorption | B | A | A | A | B | D | D |

The present application is based on the Japanese Patent Applications filed on Mar. 17, 2017 (Japanese Patent Application No. 2017-052691 and Japanese Patent Application No. 2017-052539), and the content thereof is incorporated herein by reference.

INDUSTRIAL APPLICABILITY

The thermosetting resin composition of the present invention has industrial applicability in applications such as an insulating material for electronic devices, electrical and electronic components, a sealing material, an adhesive, and an electrically conductive material.

The invention claimed is:

1. A thermosetting resin composition, comprising an epoxy resin and a curing agent,
   wherein the curing agent comprises a microcapsular curing agent (H) for epoxy resins having a core (C) and a shell (S),
   the core (C) in the microcapsular curing agent (H) for epoxy resins comprises (I): an amine adduct (AD) and its component, an amine compound (A); and (II): a curing agent (h1) other than said (I), the amine compound (A) is an amine compound represented by formula (1) below:

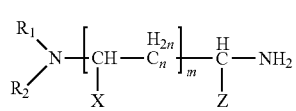

(1)

wherein $R_1$ and $R_2$ are each independently an optionally substituted alkyl group having 1 or more and 8 or less carbon atoms, an optionally substituted cycloalkyl group, or an optionally substituted benzyl group; X and Z each independently represent a hydrogen atom, an optionally substituted alkyl group having 1 or more and 8 or less carbon atoms, an optionally substituted aryl group, an optionally substituted cycloalkyl group, or an optionally substituted benzyl group; and n represents an integer of 0 or more and 8 or less; and m represents an integer of 0 or more and 4 or less,
   the curing agent (h1) is an amine compound (A') other than the amine compound (A),
   wherein a cured product of the thermosetting resin composition that has been cured at 130° C. for 15 minutes has:
   a moisture absorptivity of 2.5% or less after 168 hours at 85° C. and 85% RH; and
   a ratio of the light transmittance with a wavelength of 700 nm/the light transmittance with a wavelength of 400 nm of 2 or less.

2. The thermosetting resin composition according to claim 1, wherein
   the cured product of the thermosetting resin composition that has been cured at 130° C. for 15 minutes has:
   a light transmittance of 70% or more with a wavelength of 700 nm measured with a spectrophotometer.

3. The thermosetting resin composition according to claim 1, wherein
   the cured product of the thermosetting resin composition that has been cured at 130° C. for 15 minutes has:
   a light transmittance of 75% or more with a wavelength of 700 nm measured with a spectrophotometer.

4. The thermosetting resin composition according to claim 1, wherein
   the cured product of the thermosetting resin composition that has been cured at 130° C. for 15 minutes has:

a ratio of the light transmittance with a wavelength of 700 nm/the light transmittance with a wavelength of 400 nm of 1.22 or less.

5. The thermosetting resin composition according to claim 1, wherein the curing agent comprises:
a non-microcapsular curing agent (h).

6. The thermosetting resin composition according to claim 5, wherein
the non-microcapsular curing agent (h) is a cyanamide and/or a low molecular weight compound having a hydrazide group.

7. The thermosetting resin composition according to claim 1, wherein said (II): the curing agent (h1) other than said (I) has a number average molecular weight of 400 or less.

8. The thermosetting resin composition according to claim 1, wherein the amine adduct (AD) comprises an amine adduct having at least one tertiary amino group (d2) resulting from a reaction between an epoxy resin (e1) and an amine compound having 1 to 15 carbon atoms.

9. The thermosetting resin composition according to claim 1, wherein
the amine compound (A) has at least one tertiary amino group.

10. The thermosetting resin composition according to claim 1, wherein
said (II): the curing agent (h1) other than said (I) has a melting point of 30° C. or more and 240° C. or less.

11. The thermosetting resin composition according to claim 1, wherein
the content of the curing agent (h1) is 0.1% by mass or more and 50% by mass or less relative to 100% by mass of the core (C).

12. The thermosetting resin composition according to claim 1, further comprising an organic filler and/or an inorganic filler.

13. The thermosetting resin composition according to claim 1, wherein the amine compound (A) is N,N-dimethylaminopropylamine.

14. The thermosetting resin composition according to claim 1, wherein the curing agent (h1) other than said (I) is triethylenediamine.

* * * * *